United States Patent
Zha

(10) Patent No.: US 10,488,706 B1
(45) Date of Patent: Nov. 26, 2019

(54) BACKLIGHT MODULE HAVING A SUBSTRATE, PLURALITY OF LIGHT SOURCES, DIFFUSION FILM AND BRIGHTNESS ENHANCEMENT FILM DISPOSED ON THE SUBSTRATE

(71) Applicant: Wuhan China Star Optoelectronics Technology Co., Ltd., Wuhan (CN)

(72) Inventor: Guowei Zha, Shenzhen (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 16/210,579

(22) Filed: Dec. 5, 2018

Related U.S. Application Data

(63) Continuation of application No. PCT/CN2018/107451, filed on Sep. 26, 2018.

(30) Foreign Application Priority Data

May 28, 2018 (CN) .......................... 2018 1 0522766

(51) Int. Cl.
G02F 1/1335 (2006.01)

(52) U.S. Cl.
CPC .. *G02F 1/133605* (2013.01); *G02F 1/133603* (2013.01); *G02F 1/133606* (2013.01); *G02F 1/133611* (2013.01); *G02F 1/133621* (2013.01); *G02F 2001/133607* (2013.01); *G02F 2001/133612* (2013.01); *G02F 2001/133614* (2013.01)

(58) Field of Classification Search
CPC ......... G02F 1/133603; G02F 1/133604; G02F 1/133605; G02F 1/133606; G02F 1/133608; G02F 1/133609; G02F 2001/133614; G02F 2001/133607
See application file for complete search history.

(56) References Cited

U.S. PATENT DOCUMENTS

| | | | |
|---|---|---|---|
| 7,072,096 B2 * | 7/2006 | Holman | F21S 8/08 257/E25.02 |
| 8,110,839 B2 * | 2/2012 | Ing | G02F 1/133611 257/89 |
| 2008/0137199 A1 * | 6/2008 | Hsu | G02B 5/0215 359/599 |
| 2015/0226400 A1 * | 8/2015 | Wada | G02F 1/133611 362/97.1 |
| 2016/0103363 A1 | 4/2016 | Ning et al. | |
| 2017/0116930 A1 | 4/2017 | Johnson et al. | |

FOREIGN PATENT DOCUMENTS

| | | |
|---|---|---|
| CN | 106647020 A | 5/2007 |
| CN | 101430072 A | 5/2009 |
| CN | 107340646 A | 11/2017 |

* cited by examiner

*Primary Examiner* — Robert J May
(74) *Attorney, Agent, or Firm* — Brinks Gilson & Lione

(57) ABSTRACT

The present disclosure discloses a backlight module and a display device. The backlight module includes a substrate; and a plurality of lamp sources, a fluorescent film, a diffusion film, and a brightness enhancement film carried on the substrate. The fluorescent film, the diffusion film and the brightness enhancement film are sequentially arranged in a light emission direction of the plurality of lamp sources, and the substrate is provided with a reflection sheet configured to reflect light propagated toward the substrate.

14 Claims, 3 Drawing Sheets

BACKLIGHT MODULE HAVING A SUBSTRATE, PLURALITY OF LIGHT SOURCES, DIFFUSION FILM AND BRIGHTNESS ENHANCEMENT FILM DISPOSED ON THE SUBSTRATE

CROSS-REFERENCE TO RELATED APPLICATIONS

The present application is a continuation-application of International (PCT) Patent Application No. PCT/CN2018/107451 filed on Sep. 26, 2018, which claims foreign priority of Chinese Patent Application No. 201810522766.4, filed on May 28, 2018 in the National Intellectual Property Administration of China, the entire contents of which are hereby incorporated by reference.

TECHNICAL FIELD

The present disclosure relates to the field of display technologies, and more particularly, to a backlight module and a display device.

BACKGROUND

Currently, a drive bonding zone is generally reserved at a lower border of a display device such as a liquid crystal display (LCD). As shown in FIG. 1, the lower border 11 of the display device 10 is provided with a fanout region 12, an integrated-circuit (IC) bonding region 13, and a flexible printed circuit (FPC) bonding region 14. The fanout region 12 fans out wires such as data lines, the IC bonding region 13 is provided with an IC such as a source driver, and the FPC bonding region 14 is provided with an FPC. The three regions make it be difficult to reduce the width of the lower border 11. To increase a screen-to-body ratio, circuit on film (COF) design has been widely used in existing display devices. As shown in FIG. 2, a lower border 21 of a display device 20 is only provided with an FPC bonding region 22, and an IC 23 is directly arranged in the FPC bonding region 22.

A backlight module of the display device 20 may be an edge-type backlight module or a direct-type backlight module. As shown in FIG. 3, in the structural design of an edge-type backlight module 30, a lamp source 31 is positioned on one side of a light guide plate 32, and a light mixing region 33 is located between the lamp source 31 and an effective operation region (i.e., a region overlapped with an effective display region 24 of the display device 20, see FIG. 2) of the light guide plate 32 to ensure uniform light emission and prevent hotspots from being generated near the lamp source 31. To effectively utilize space, with reference to FIG. 2 and FIG. 3, the lamp source 31 is arranged in the lower border area 21 of the display device 20. However, because the lamp source 31 itself has a certain thickness, and the dimensions of the light mixing region 33 are related to light emission uniformity of the display device 20, it is difficult to reduce the size of the lower border 21. Generally, the limit size of the lower border 21 is about 2 mm-3 mm, which is still of a larger gap from left and right borders (less than 1 mm).

In the display device 20 using the direct-type backlight module, the lamp source is positioned at a back (instead of a side) of the effective display region 24 of the display device 20, such that the size of the lower border 21 can be reduced. However, in the direct-type backlight module, the light mixing region required by the lamp source is arranged at the back of the effective display region 24, which may undoubtedly cause larger thickness of the direct-type backlight module, and thus is disadvantageous to thin design of the direct-type backlight module and the display device 20. To achieve the smaller light mixing distance required for the thin design, in the related art, smaller-sized lamp sources (such as mini-LEDs) are used generally and are arranged at a smaller spacing, wherein both the sizes of the lamp sources and the spacing between adjacent lamp sources typically are less than 1 mm. To satisfy the brightness required for display by the display device 20, the number of the lamp sources is larger, and these lamp sources may undoubtedly occupy a larger area, and the lamp sources cannot reflect light. Therefore, light reflected by a brightness enhancement film (BEF) cannot be reused, or even a portion of the light may be absorbed by a structure such as a substrate or the like under the lamp source, such that the light efficiency (i.e., light utilization efficiency) may be reduced, which is disadvantageous to enhancing the front display brightness of the display device 20.

SUMMARY

On this account, the present disclosure provides a backlight module and a display device, which can improve a light efficiency and are advantageous to enhance a front display brightness of the display device.

The backlight module according to an embodiment of the present disclosure includes: a substrate; a reflection sheet, arranged on an upper surface of the substrate and provided with a plurality of open regions; a plurality of lamp sources, carried on the substrate and positioned in the open regions; and a fluorescent film, covering the plurality of lamp sources and the reflection sheet. the reflection sheet is configured to reflect light propagated toward the substrate so that the light is reflected along a light emission direction of the plurality of lamp sources.

The backlight module according to an embodiment of the present disclosure includes a substrate, a plurality of lamp sources carried on the substrate, a fluorescent film, a diffusion film, and a brightness enhancement film. The fluorescent film, the diffusion film and the brightness enhancement film are sequentially arranged in a light emission direction of the plurality of lamp sources. The substrate is provided with a reflection sheet configured to reflect light propagated toward the substrate so that the light is reflected along the light emission direction of the plurality of lamp sources.

The display device according to an embodiment of the present disclosure includes the backlight module.

Beneficial effects of the present disclosure are as below: the substrate is provided with a reflection sheet that may reflect light propagated toward the substrate, for example, light reflected by the brightness enhancement film, such that the light reflected is propagated toward the light emission direction of the backlight module. In this way, a light efficiency can be improved, and a front light emission brightness of the backlight module is enhanced, which is advantageous to increasing a front display brightness of the display device.

DETAILED DESCRIPTION

A primary objective of the present disclosure is as below: in a direct-type backlight module, a substrate is provided with a reflection sheet that may reflect light propagated toward the substrate, for example, light reflected by the brightness enhancement film, such that the light reflected is propagated toward the light emission direction of the backlight module. In this way, a light efficiency can be improved, and a front light emission brightness of the backlight module is enhanced, which is advantageous to increasing a front display brightness of the display device.

Technical solutions in each of the embodiments of the present disclosure are clearly and completely described below with reference to the accompanying drawings. The following embodiments and technical features thereof may be combined with each other on a non-conflict basis. Furthermore, directional terms such as "above" and "beneath" are used herein to better describe each of the embodiments but are not intended to limit the scope of protection of the present disclosure.

Figure 1:
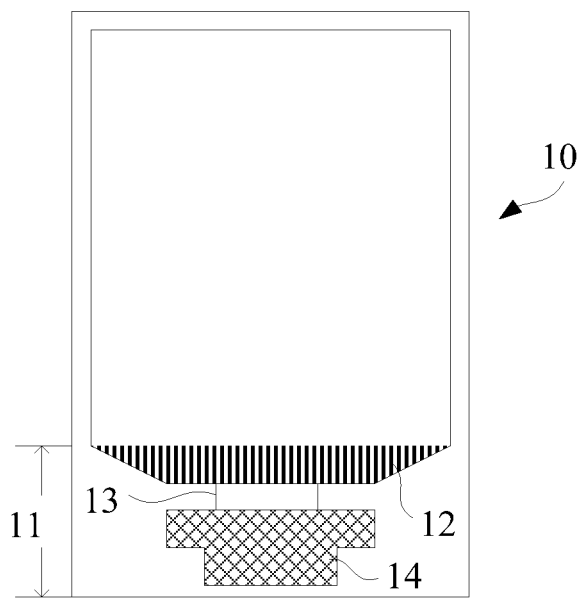
FIG. 1 is a schematic structural vertical view of a display device according to an embodiment of the related art.
Figure 2:
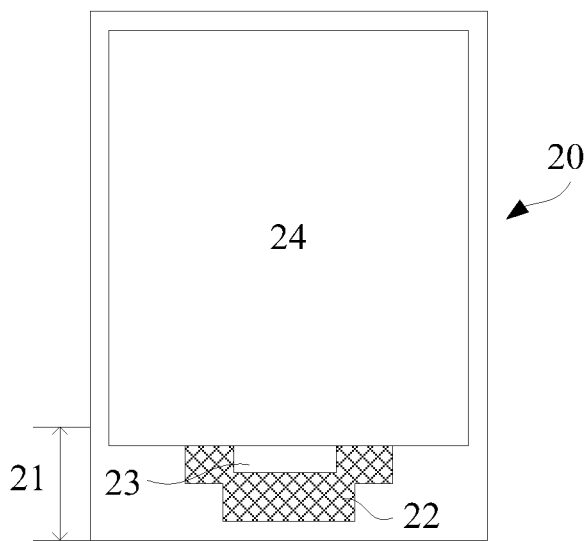
FIG. 2 is a schematic structural vertical view of a display device according to another embodiment of the related art.
Figure 3:
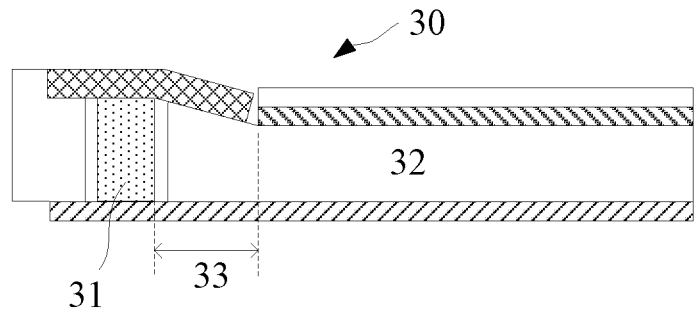
FIG. 3 is a schematic structural cross-section view of an edge-type backlight module according to an embodiment of the related art.
Figure 4:
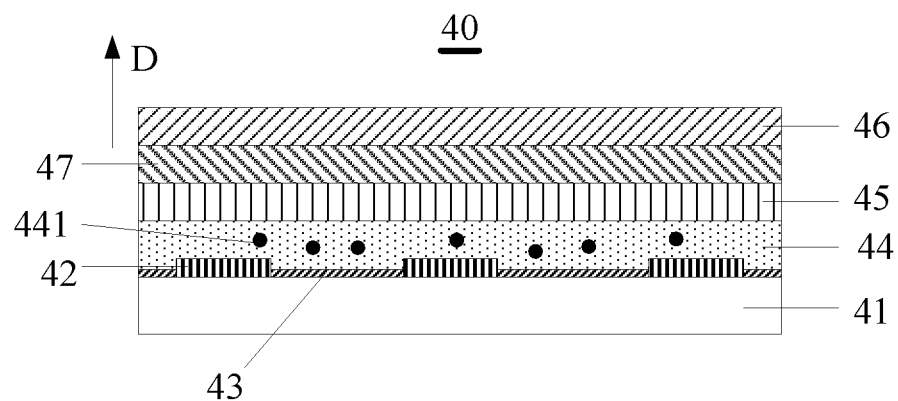
FIG. 4 is a schematic structural cross-section view of a backlight module according to an embodiment of the present disclosure.

FIG. 4 is a schematic structural cross-section view of a backlight module according to an embodiment of the present disclosure. Referring to FIG. 4, the backlight module 40 includes a substrate 41 and layered structures positioned on the substrate 41: a plurality of lamp sources 42, a reflection sheet 43, a fluorescent film 44, a diffusion film 45, and a brightness enhancement film 46.

The substrate 41 may be regarded as a drive substrate of the backlight module 40, and not only may be configured to support the above structural elements, but also may arrange a drive circuit driving a plurality of lamp sources 42 to emit light, for example, a flexible printed circuit (FPC), or a printed circuit board (PCB), an integrated circuit (IC) and relevant wires.

The reflection sheet 43 is adhered to an upper surface of the substrate 41, and the upper surface of the substrate 41 can reflect light. The reflection sheet 43 is not an entire-surface structure, but is provided with a plurality of open regions. In the light emission direction D of the backlight module 40, shapes and sizes of the open regions completely match with shapes and sizes of the lamp sources 42, and the lamp sources 42 are positioned in the open regions of the reflection sheet 43.

The plurality of lamp sources 42 are arranged, in an array, on the substrate 41, and are separately connected to a drive circuit and may emit light having predetermined color such as blue light under the drive of the drive circuit. The lamp sources 42 may be mini-LEDs, and each of the lamp sources 42 may have a size of 100 μm-1,000 μm, and the distance between adjacent lamp sources 42 may be 100 μm-2,000 μm. In this way, a micro light emitting array is constituted.

These lamp sources 42 may be positioned in the same layer, for example, in a planar layer. Specifically, after the plurality of lamp sources 42 are arranged, the planar layer is coated and formed between adjacent lamp sources 42. The upper surface of the planar layer is designed as a plane to bond with the fluorescent film 44. Of course, in the present disclosure, the planar layer may be not arranged. Instead, the plurality of lamp sources 42 may directly covered by the fluorescent film 44, wherein the fluorescent film 44 may be fabricated and formed by way of thermo-compression bonding. The material for fabricating the fluorescent film 44 is in a molten state at a high temperature (<300° C.). Therefore, the finally fabricated fluorescent film 44 comes into close contact with the plurality of lamp sources 42 and the reflection sheet 43. Therefore, packaging layers of the lamp sources 42 and the reflection sheet 43 should be made from heat-resisting materials.

The fluorescent film 44 is arranged in the light emission direction D of the lamp sources 42. The fluorescent film 44 may be formed mixedly by a fluorescent medium (also referred to as a photoluminescent particle), a scattering particle 441, and a transparent adhesive (for example, transparent silica gel), etc. Furthermore, the light mixing uniformity and the wavelength of light emitted from the fluorescent film 44 may be fine-tuned by controlling the proportion between the fluorescent medium and the scattering particle 441. The fluorescent medium may emit light having a longer wavelength when being excited by light having a shorter wavelength. Specifically, if the light emitted from the lamp sources 42 is regarded as first primary color light, the fluorescent medium may emit second primary color light and third primary color light when being excited by the first primary color light, and both the wavelength of the second primary color light and the wavelength of the third primary color are greater than that of the first primary color light. The scattering particle 441 is a transparent material and configured to scatter light. Furthermore, the refractive index of the scattering particle 441 is smaller than that of transparent adhesive for fabricating the fluorescent film 44, and thus light rays emitted from the fluorescent film 44 have a larger light emission angle.

The diffusion film 45 is arranged in the light emission direction D of the fluorescent film 44, and is configured to adjust the light emitted from the fluorescent film 44 to be uniformly distributed, i.e., the light is changed into Lambert light.

The brightness enhancement film 46 is arranged in the light emission direction D of the diffusion film 45. As a commonly referred prismatic lens, the brightness enhancement film 46 allows light having a predetermined angle of inclination to transmit, and centralize the transmitted light toward a central angle of view to enhance the front display brightness.

In the operation process of the backlight module 40, taking an example in which the lamp source 42 is a blue light LED, when blue light (regarded as the first primary color light) is propagated to the fluorescent film 44, the fluorescent medium in the fluorescent film 44 is excited and emits red light (regarded as the second primary color light) and green light (regarded as the third primary color light). Reflected by the brightness enhancement film 46, a portion of light is reflected and propagated toward the direction of the substrate 41. When this portion of light is propagated to the reflection sheet 43, the reflection sheet 43 propagates this portion of light toward the light emission direction D of the backlight module 40, and this portion of light is reused, which is advantageous to improving the light efficiency. In this reflection process, the blue light is reflected by the reflection sheet 43 and is further propagated to the fluorescent film 44 to continue exciting the fluorescent medium therein to emit the red light and the green light, which may further improve the light efficiency.

Figure 5:
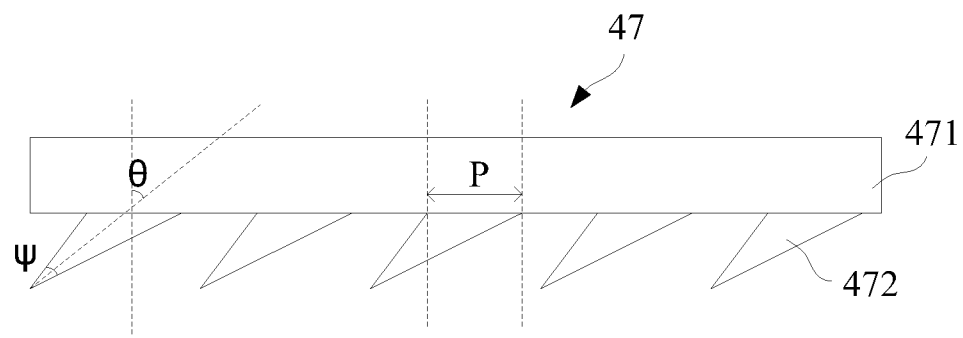
FIG. 5 is a schematic structural cross-section view of a directional film of the backlight module as shown in FIG. 4.

Further referring to FIG. 4, the backlight module 40 further includes a directional film 47 positioned between the fluorescent film 44 and the brightness enhancement film 46. With reference to FIG. 5, the directional film 47 includes a transparent body 471 and a plurality of cone-shaped bulges 472. These cone-shaped bulges 472 are arranged at intervals on a surface of a side of the transparent body 471 and have an equal width P such as 1 μm-50 μm. Moreover, the distance between any two adjacent cone-shaped bulges 472 also may be equal. The cone-shaped bulges 472 may be arranged toward a side of the fluorescent film 44, or may be arranged toward a side of the brightness enhancement film 46. A center angle θ of the cone-shaped bulge 472 is an acute angle such as 10°-60°. The center angle θ is an included angle between a bisector of an apex angle w of the cone-shaped bulge 472 and a direction of gravity. The apex angle w of the cone-shaped bulges 472 also is an acute angle at least greater than 30° and smaller than 90°.

In a practical application scenario, the directional film 47 may be an integrally-molded structure. For example, in the present disclosure, the directional film 47 may be fabricated by way of one-step injection molding by using at least one of polymethyl methacrylate (PMMA), polycarbonate (PC), polystyrene (PS), and styrene-methyl methacrylate copolymer (MS). Of course, the transparent body 471 and the plurality of cone-shaped bulges 472 also may be formed by multiple manufacture procedures, but the transparent body 471 and the plurality of cone-shaped bulges 472 should be made from the same material and have the same refractive index.

In the operation process of the backlight module 40, after the Lambert light emitted from the diffusion film 45 enters the directional film 47, the Lambert light may be distributed in the direction of the center angle θ of the cone-shaped bulge 472, and thus the uniformly-distributed light is changed into directionally-distributed light, which may ensure that the light propagated to the brightness enhancement film 46 has an angle required for the light to emit from the brightness enhancement film 46. Therefore, according to the present disclosure, the light emission efficiency of the brightness enhancement film 46 may be improved, and the front light emission brightness of the backlight module 40 may be enhanced, which is advantageous to enhancing the front light emission brightness of the display device having the backlight module 40.

It is to be understood that the backlight module 40 of the present disclosure further includes other structural elements such as a glue frame, etc. Reference may be made to the prior art for arrangement modes and working principles of these structural elements.

Figures 6, 7:
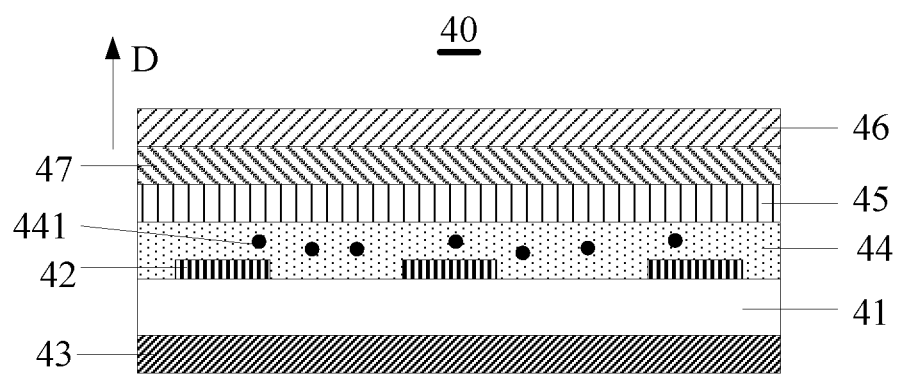
FIG. 6 is a schematic structural cross-section view of a backlight module according to another embodiment of the present disclosure.
FIG. 7 is a schematic structural diagram of a display device according to an embodiment of the present disclosure.

FIG. 6 is a schematic structural cross-section view of a backlight module according to another embodiment of the present disclosure. For ease of description, the same numeral represents structural elements having the same names in the present disclosure. Based on the description of the foregoing embodiments but different from the foregoing embodiments, as shown in FIG. 6, the reflection sheet 43 in this embodiment is arranged at a side of the substrate 41 back to the lamp source 42, i.e., the reflection sheet 43 is adhered to a back surface of the substrate 41. The substrate 41 in this embodiment is a transparent substrate.

Still taking an example in which the lamp source 42 is a blue light LED, when blue light is propagated to the fluorescent film 44, the fluorescent medium in the fluorescent film 44 is excited and emits red light and green light. Reflected by the brightness enhancement film 46, a portion of light is reflected and propagated through the transparent substrate 41, and is further propagated to the reflection sheet 43, and then the reflection sheet 43 propagates the light toward the light emission direction D of the backlight module 40, which is advantageous to improving the light efficiency. Likewise, in this reflection process, the blue light is reflected by the reflection sheet 43 and is further propagated to the fluorescent film 44 to continue exciting the fluorescent medium to emit the red light and the green light, which may further improve the light efficiency.

Based on the above description, the substrate 41 may be made from transparent polyimide (PI), and a temperature of resistance of the substrate 41 not only is higher than the temperature required for LED (lamp source 42) die bonding and reflow soldering, but also is higher than the temperature required for the fluorescent film 44 changed into the molten state. Therefore, when the LED is installed and the fluorescent film 44 is formed, the substrate 41 still can maintain its stability characteristic.

Further, to prevent loss of light rays in the above multiple reflection possesses, the surface of the drive wire of the substrate 41 also may have a light reflection function. Specifically, the material of the drive wire may be metal having a higher reflectivity, for example, silver or aluminum, etc.

The present disclosure also provides a display device. As shown in FIG. 7, the display device 70 includes a backlight module 71 and a liquid crystal display panel 72 arranged in the light emission direction of the backlight module 71. The backlight module 71 may be the backlight module 40 according to any one of foregoing embodiments. Therefore, the display device 70 also has the beneficial effects of the backlight module 40.

It is to be explained again that the above are merely embodiments of the present disclosure and are not intended to limit the patent scope of the present disclosure. Any modifications of equivalent structure or equivalent process, such as mutual combination of technical features of the embodiments, made on the basis of the contents of the description and accompanying drawings of the present disclosure or directly or indirectly applied to other related technical fields shall similarly fall within the scope of patent protection of the present disclosure.

What is claimed is:
1. A backlight module, comprising:
a substrate;
a reflection sheet, arranged on an upper surface of the substrate and provided with a plurality of open regions;
a plurality of lamp sources, disposed on the substrate and positioned within the open regions; and
a fluorescent film, covering the plurality of lamp sources and the reflection sheet;
wherein the reflection sheet is configured to reflect any light propagated back toward the substrate by a brightness enhancement film along a light emission direction of the plurality of lamp sources;
wherein a diffusion film, a directional film, and the brightness enhancement film are sequentially arranged on the fluorescent film;
wherein the directional film comprises a transparent body and a plurality of cone-shaped bulges arranged at intervals on a surface of the transparent body, and a central angle of the cone-shaped bulge is an acute angle.

2. The backlight module according to claim 1, wherein the center angle of the cone-shaped bulge ranges from 10° to 60°, and the apex angle of the cone-shaped bulge is an acute angle at least greater than 30°.

3. A backlight module, comprising:
a substrate; and
a plurality of lamp sources, a fluorescent film, a diffusion film, and a brightness enhancement film disposed on the substrate; wherein:
the fluorescent film, the diffusion film and the brightness enhancement film are sequentially arranged in a light emission direction of the plurality of lamp sources, and
the substrate is provided with a reflection sheet, the reflection sheet is configured to reflect any light propagated back toward the substrate by the lightness enhancement film along the light emission direction of the plurality of lamp sources;
wherein the substrate is transparent, and the reflection sheet is adhered to a side of the substrate opposite to the lamp sources, and the reflection sheet comprises an entire-surface structure.

4. The backlight module according to claim 3, wherein the reflection sheet is adhered to an upper surface of the substrate and is provided with a plurality of open regions, and the lamp sources are positioned within the open regions.

5. The backlight module according to claim 3, wherein the substrate carries a drive wire configured to drive the plurality of lamp sources, and a surface of the drive wire is configured to reflect light.

6. The backlight module according to claim 3, wherein a material of the substrate comprises polyimide (PI).

7. The backlight module according to claim 3, further comprising a directional film positioned between the fluorescent film and the brightness enhancement film, wherein the directional film comprises a transparent body and a plurality of cone-shaped bulges arranged at intervals on a surface of the transparent body, and a center angle of the cone-shaped bulge is an acute angle.

8. The backlight module according to claim 7, wherein the central angle of the cone-shaped bulge ranges from 10° to 60°.

9. The backlight module according to claim 8, wherein an apex angle of the cone-shaped bulge is an acute angle at least greater than 30°.

10. A display device, comprising:
a backlight module, wherein the backlight module comprises:
a substrate; and
a plurality of lamp sources, a fluorescent film, a diffusion film, and a brightness enhancement film disposed on the substrate;
wherein the fluorescent film, the diffusion film and the brightness enhancement film are sequentially arranged in a light emission direction of the plurality of lamp sources, and
the substrate is provided with a reflection sheet, the reflection sheet is configured to reflect any light propagated back toward the substrate by the brightness enhancement along the light emission direction of the plurality of lamp sources;
wherein the substrate is transparent, and the reflection sheet is adhered to a side of the substrate opposite to the lamp sources, and the reflection sheet comprises an entire-surface structure.

11. The display device according to claim 10, wherein the reflection sheet is adhered to an upper surface of the substrate and is provided with a plurality of open regions, and the lamp sources are positioned within the open regions.

12. The display device according to claim 10, wherein the substrate carries a drive wire configured to drive the plurality of lamp sources, a surface of the drive wire is configured to reflect light.

13. The display device according to claim 10, further comprising a directional film positioned between the fluorescent film and the brightness enhancement film, wherein the directional film comprises a transparent body and a plurality of cone-shaped bulges arranged at intervals on a surface of the transparent body, and a center angle of the cone-shaped bulge is an acute angle.

14. The display device according to claim 13, wherein the central angle of the cone-shaped bulge ranges from 10° to 60°, and the apex angle of the cone-shaped bulge is an acute angle at least greater than 30°.

* * * * *